Oct. 3, 1950  H. WOOD  2,524,493
WAVE-SIGNAL RESPONDER SYSTEM
Filed July 22, 1947
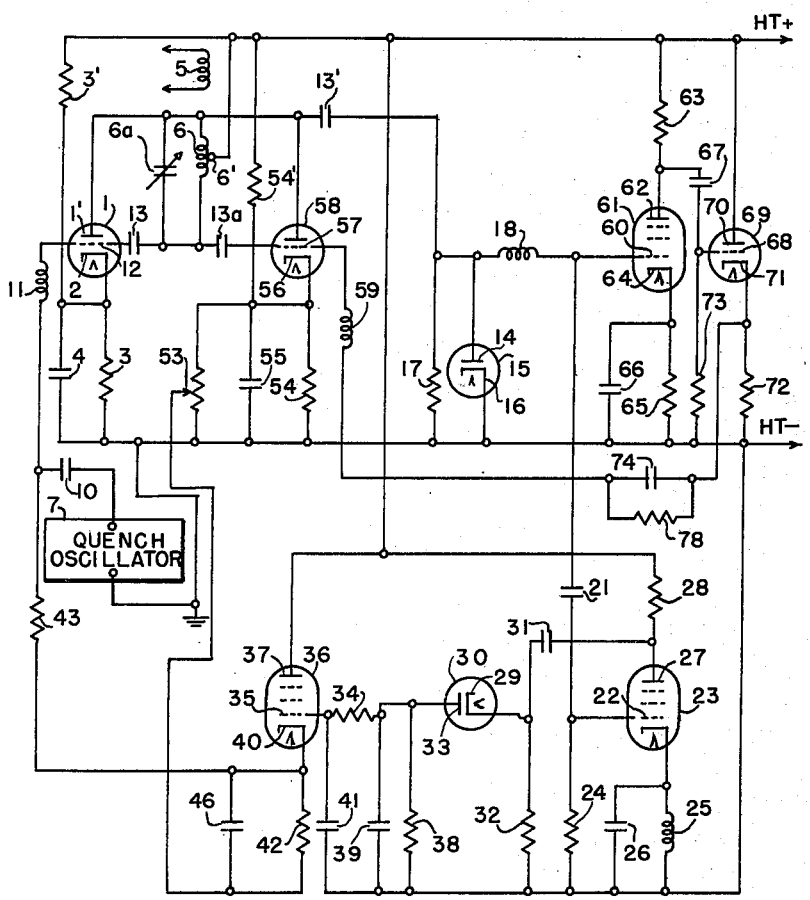
*INVENTOR.*
HUBERT WOOD
BY
ATTORNEY Patented Oct. 3, 1950

2,524,493

UNITED STATES PATENT OFFICE 2,524,493

WAVE-SIGNAL RESPONDER SYSTEM

Hubert Wood, Hollinwood, England, assignor to Ferranti Limited, Hollinwood, England, a corporation of Great Britain Application July 22, 1947, Serial No. 762,733
In Great Britain November 30, 1945

Section 1, Public Law 690, August 8, 1946
Patent expires November 30, 1965

4 Claims. (Cl. 250—15)

This invention relates to superregenerative radio receivers which are associated with transmitting means, and usually known as "responders," for the purpose of receiving signal pulses from a remote transmitting station, modifying the wave form of such signal pulses in a manner predetermined in accordance with the nature or identity of the object in which the receiver is embodied and then transmitting the modified signal pulses, thereby providing an indication of the nature or identity of the object to a remote station adapted to receive the modified signal pulses. Such a receiver-transmitter or responder is herein referred to as being "of the type stated." More specifically, the invention relates to a receiver-transmitter of the type stated provided with means for maintaining the sensitivity of the receiver at a constant or nearly constant level as a characteristic of the receiver is altered. By a "characteristic of the receiver" we mean, for example, the frequency to which the receiver is tuned (which may be varied over a wide range) or the value of the high-tension supply, or the aerial loading (which may vary with changing frequency or with moisture deposition). Such means have been termed automatic-gain-stabilization or A. G. S. systems and are herein referred to as such. In a system, described and claimed in copending United States applications Serial No. 762,730, filed July 22, 1947, and Serial No. 762,732, filed July 22, 1947, a potential is derived from the random or "noise" voltage fluctuations present in the circuit of the superregenerative receiver valve and is utilized to maintain the sensitivity of such valve constant or nearly constant by controlling the amount of regeneration, e. g. by varying its grid-to-cathode bias potential.

It has been found that a difficulty arises during the course of operation of receiver-transmitters of the type stated provided with an auto-gain-stabilization system.

The signal input to such a receiver-transmitter comprises a series of interrogating pulses of short duration. It is possible that certain frequency components of each pulse may pass through the auto-gain-stabilization system along with the random voltage fluctuations. Hence, when the receiver sensitivity is adjusted to an adequate value the control grid of the receiving valve is maintained by the auto-gain-stabilization system at a potential appropriate to this sensitivity, this potential being determined by the random or "noise" voltage fluctuations present in the superregenerative valve circuit.

If such receiver is now subject to interrogating pulse signals at a certain recurrence frequency the stabilizing potential applied to the superregenerative valve is determined not only by the random "noise" voltages but also by appropriate components of the recurrent pulse signals and the over-all receiver sensitivity will decrease. As the pulse-recurrence frequency of the interrogating signal increases, the component of the auto-gain-stabilization output potential due to the pulses increases, and the control grid potential of the superregenerative receiving valve automatically alters to reduce correspondingly the over-all receiver sensitivity, the component of the stabilizing potential due to random "noise" becoming progressively less with consequent reduction of effectiveness of the auto-gain-stabilization system to meet any changes in receiver characteristics that may occur.

It will be seen that an upper limit is set to the pulse-recurrence frequency of interrogating signal capable of operating the responder satisfactorily since as the recurrence frequency increases, the sensitivity decreases.

This effect is most serious when the quenching-frequency component of the random voltage fluctuations is employed for deriving the stabilizing potential since the tuned circuits associated with the auto-gain-stabilization system become shock excited by an input pulse owing to their high Q (reactance-resistance ratio) values.

The main object of the present invention is to provide a superregenerative receiver-transmitter of the type stated having means for maintaining the sensitivity of the receiver at a constant or nearly constant level as a characteristic of the receiver is altered, in which the sensitivity level remains substantially constant despite alterations in the recurrence frequency of the signal pulses received and retransmitted thereby.

According to the present invention a super-regenerative receiver-transmitter of the type stated, having means for maintaining the sensitivity of the superregeneratively operated receiver valve at a constant or nearly constant level as a characteristic of the receiver is altered, includes means for deriving a potential directly or inversely proportional to the frequency of recurrence of signal pulses received from a remote transmitting station and means for utilizing such potential to counteract any divergence of sensitivity of said valve from its constant or nearly constant level consequent upon the reception of signal pulses of different recurrence frequencies.

Also, according to a feature of the invention as set forth in the preceding paragraph, the means for deriving said counteracting potential is associated with the cathode of the transmitting valve included in said receiver-transmitter.

The accompanying drawing shows by way of example, a superregenerative radio receiver-transmitter of the type stated, having means for maintaining the sensitivity of the receiver at a constant or nearly constant level as a characteristic of the receiver is altered and embodying the present invention.

For a better understanding of the present invention, together with other and further objects thereof, reference is had to the following description taken in connection with the accompanying drawing, and its scope will be pointed out in the appended claims.

In this embodiment a triode superregenerative receiving valve 1 is arranged as a Hartley-type oscillator with a tuned circuit comprising inductance 6 and parallel variable condenser 6a connected between its anode 1' and control grid 12 by way of condenser 13. Cathode 2 of valve 1 is connected to the earthed negative pole of a high-tension supply by way of a biasing resistance 3 and its parallel decoupling condenser 4 and to the positive pole of the high-tension supply by way of resistance 3'. An aerial (not shown) is coupled by coil 5 to the inductance coil 6 of tuned circuit 6, 6a of the oscillator, the mid-point 6' of the coil being connected to the positive pole of the high-tension supply. The requisite quenching oscillations are supplied from a quench-frequency oscillator 7 by way of blocking condenser 10 and high-frequency choke 11 into the control grid circuit of valve 1.

The end of tuned circuit 6, 6a which is connected by way of condenser 13 to control grid 12 of triode valve 1 is also connected by way of condenser 13a to the control grid 57 of a triode transmitting valve 58, the anode of which is joined to the other end of tuned circuit 6, 6a. Cathode 56 of valve 58 is connected to earth by way of a biasing resistance 54 having a condenser 55 in parallel therewith and to the positive pole of the high-tension supply by way of a resistance 54'. The anode side of tuned circuit 6 is connected by way of a condenser 13' to the anode 14 of a diode detector valve 15, the cathode 16 of which is earthed. The anode and cathode of this diode valve are shunted by load resistance 17. Anode 14 of this valve is also connected by way of radio-frequency choke 18 to the control grid 60 of a pentode amplifier valve 61. The cathode 64 of valve 61 is connected to earth through the parallel combination of biasing resistance 65 and decoupling condenser 66. Anode 62 of valve 61 is joined to the positive pole of the high-tension supply by way of load resistance 63, and is also connected by way of a condenser 67 to control grid 68 of triode valve 69. Anode 70 of valve 69 is joined directly to the positive pole of the high-tension supply while its cathode 71 is joined to earth by way of cathode load resistance 72 and is further connected through a pulse-width controlling circuit comprising condenser 74 and parallel resistance 78 and radio-frequency choke 59 to control grid 57 of transmitting valve 58. A grid-leak resistance 73 is connected between control grid 68 and earth.

A further connection is made from the control grid 60, and one end of radio-frequency choke 18, by way of condenser 21 to control grid 22 of pentode amplifier valve 23, a grid-leak resistance 24 being provided to earth. The cathode of valve 23 is connected to earth through an inductance coil 25 and a parallel condenser 26, while anode 27 is joined to the positive pole of the high-tension supply by way of anode load resistance 28. Anode 27 is further connected through condenser 31 to cathode 29 of a diode rectifier valve 30, the anode 33 of which is connected to earth by way of load resistance 38. Cathode 29 is also joined to earth through a resistance 32. Anode 33 is further connected through a smoothing circuit comprising earthed condenser 39, resistance 34 and earthed condenser 41, to control grid 35 of a pentode valve 36. The anode 37 of valve 36 is connected directly to the positive pole of the high-tension supply and cathode 40 of this valve is connected by way of resistance 42 and parallel condenser 46 to the adjustable tapping point on a potentiometer 53 shunted across the resistance 54 in the cathode circuit of transmitting valve 58. Cathode 40 is also joined by way of grid-leak resistance 43 and high-frequency choke 11 to the control grid 12 of superregenerative receiving valve 1.

In operation, signal pulses transmitted from a ground or other remote station are picked up by the aerial and fed by way of coil 5 to the tuned circuit 6, 6a for superregenerative amplification by valve 1 and are then rectified by diode valve 15 and its associated components. The resulting rectified signals are subsequently amplified by pentode valve 61 and then applied to the control grid circuit of valve 69. The pulse output appearing across resistance 72 is modified insofar as its width is concerned by the pulse-width controlling circuit formed by condenser 74 and resistance 78 and appears in this modified form at the control grid 57 of the transmitting valve 58. Valve 58 is thereby caused to oscillate violently and cause transmission of a response signal pulse.

At the same time the resulting rectified signals from diode valve 15 which, during periods between reception of signal pulses, are derived mainly from the random "noise" voltage fluctuations present in superregenerative receiving valve 1, are amplified by pentode valve 23. The strong quench-frequency component of these random voltage fluctuations is abstracted by the degenerative action of tuned rejector circuit 25, 26, the remainder being fed to diode valve 30 for rectification. The rectified random voltage fluctuations develop a mean direct current in resistance 38, and the potential across it is smoothed by circuit 39, 34, 41 before application to the control grid circuit of valve 36. The potential across resistance 42 and the lower part of resistance 53 is applied to the control grid circuit of valve 1. In this manner the amount of reaction is varied by varying the grid-to-cathode bias of valve 1 and serves to maintain the sensitivity constant in the following manner.

In the absence of any received interrogating signal pulses the control grid to cathode bias potential of the superregenerative valve 1 comprises the sum of three voltages namely that developed across the resistance 3 by the current flow through the receiving valve 1 and the resistance 3', that developed across the resistance 42 by the current flow through valve 36 and that developed across the lower part of resistance 53 by current flow through resistance 54' (transmitting valve 58 is inoperative and therefore cut off) and also by the current flow through valve 36. It will be observed that the potential across resistance 3 is in opposition to those across the resistance 42 and 53 and is greater than the sum of the latter whereby the net potential of the control grid 12 is negative with respect to the cathode 2. The precise value of this negative bias potential is adjusted by suitable choice of components to give optimum operating condition for the superregenerative valve 1. These conditions are maintained substantially constant, in the absence of any received signals by suitable variation of the potential across the resistance 42, brought about by rectification and amplification of the random "noise" voltages in the circuit of valve 1 in the manner more fully described in the above-mentioned co-pending applications.

Upon the reception of an interrogating pulse signal, the current flow through valve 36 tends to fall owing to increase in the rectified negative potential applied from the diode 30 to the control grid 35 and due to the inclusion with the random noise voltages, of a voltage derived from certain frequency components of the received interrogating signal pulses. In the normal way this would cause a decrease in the potential drop in resistances 42 and 53 and an unjustified decrease in the regeneration and hence sensitivity of the valve 1. Simultaneously, however, such received interrogation signal pulses cause operation of the transmitting valve 58 to radiate response signals thereto. This operation of the valve 58 gives rise to an increase in the mean current flow through resistances 53 and 54, the extent of such increase being proportional to the recurrence frequency of the response pulses provided by the valve 58, i. e., the recurrence frequency of the interrogating signal. In consequence of this operation of valve 58 the voltage developed across the lower part of potentiometer 53 increases and, by suitable adjustment of the tapping position, may be made to compensate for the previously described fall in the potential across resistance 42 on account of the incoming signal pulses. As the recurrence frequency of the interrogating pulses increases so the potential across resistance 42 falls while the potential across the lower part of potentiometer 53 rises to compensate therefor. The converse operation ensues if the recurrence frequency of the interrogating pulses falls or if they cease altogether. The resultant effect is to maintain the sensitivity constant since the decrease and increase in compensating voltage are equal and cancel out.

In this manner the sensitivity of the super-regenerative receiving valve is maintained substantially constant as the interrogating signal pulse-recurrence frequency changes.

In this embodiment it is advisable to allow a small change in sensitivity to accompany a variation of signal pulse-recurrence frequency since any attempt at overcorrection renders the receiver unstable. Undercorrection may be effected by moving the tapping point on resistance 53.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A superregenerative radio receiver-transmitter of the type stated having means for maintaining the sensitivity of the superregeneratively operated valve at a constant or nearly constant level as a characteristic of the receiver is altered, in which means are provided for deriving a potential having a value varying with the recurrence frequency of the pulse signal received from a remote transmitting station and means for utilizing such potential to counteract any divergence of sensitivity of said valve from its constant or nearly constant level consequent upon the reception of signal pulses of different recurrence frequencies.

2. A superregenerative radio receiver-transmitter as claimed in claim 1 in which said means for deriving a counteracting potential is associated with the cathode of the transmitting oscillator valve of the receiver-transmitter.

3. A superregenerative radio receiver-transmitter as claimed in claim 1 in which said means for deriving a counteracting potential comprises a resistance potentiometer network in the cathode circuit of the transmitting oscillator valve.

4. A superregenerative radio receiver-transmitter of the type stated having means for maintaining the sensitivity of the superregeneratively operated valve at a constant or nearly constant level as a characteristic of the receiver is altered, in which means are provided for deriving a potential directly proportional to the recurrence frequency of the pulse signal received from a remote transmitting station and means for utilizing said potential to counteract any divergence of sensitivity of said valve from its constant or nearly constant level consequent upon the reception of signal pulses of different recurrence frequencies.

HUBERT WOOD.

REFERENCES CITED

The following references are of record in the file of this patent:

UNITED STATES PATENTS

| Number | Name | Date |
| --- | --- | --- |
| 2,414,992 | Wheeler | Jan. 28, 1947 |
| 2,415,667 | Wheeler | Feb. 11, 1947 |
| 2,429,513 | Hansen et al. | Oct. 21, 1947 |